Aug. 25, 1942.   P. W. LEE ET AL   2,293,908
ALL CERAMIC DENTURE BASE WITH TEETH, PROCESS
AND MATERIALS FOR PRODUCING SAME
Filed May 31, 1939   3 Sheets-Sheet 3
FIG_3.
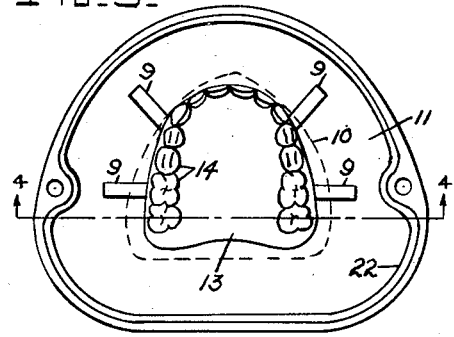
FIG_6.
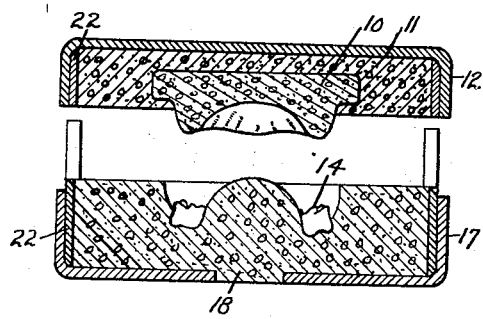
FIG_4.
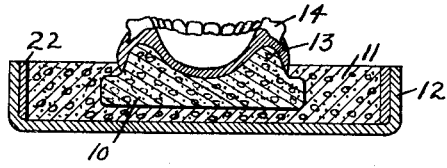
FIG_7.
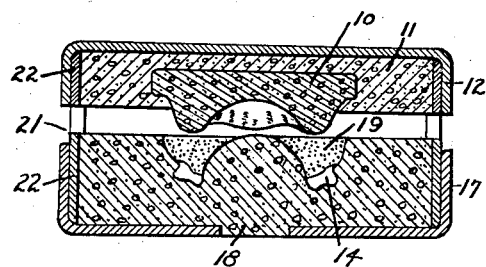
FIG_5.
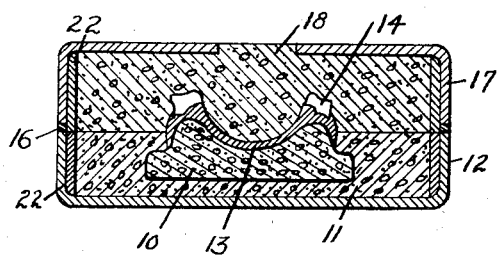
FIG_8.
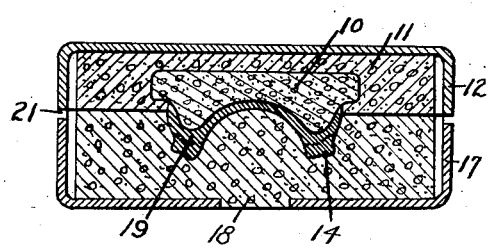
INVENTORS
PYUNGTOO WILLIAM LEE
AND CHARLES DIETZ
BY
ATTORNEY Patented Aug. 25, 1942

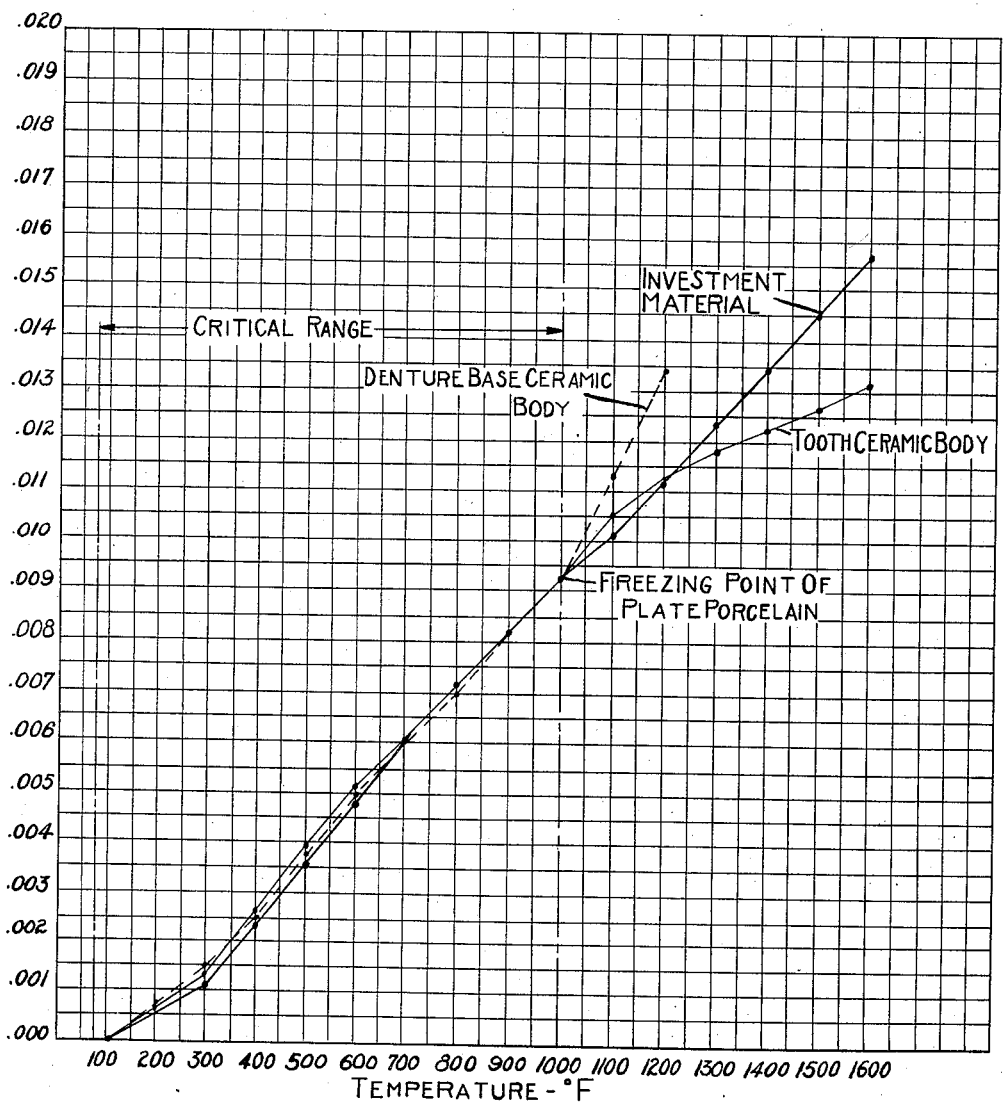

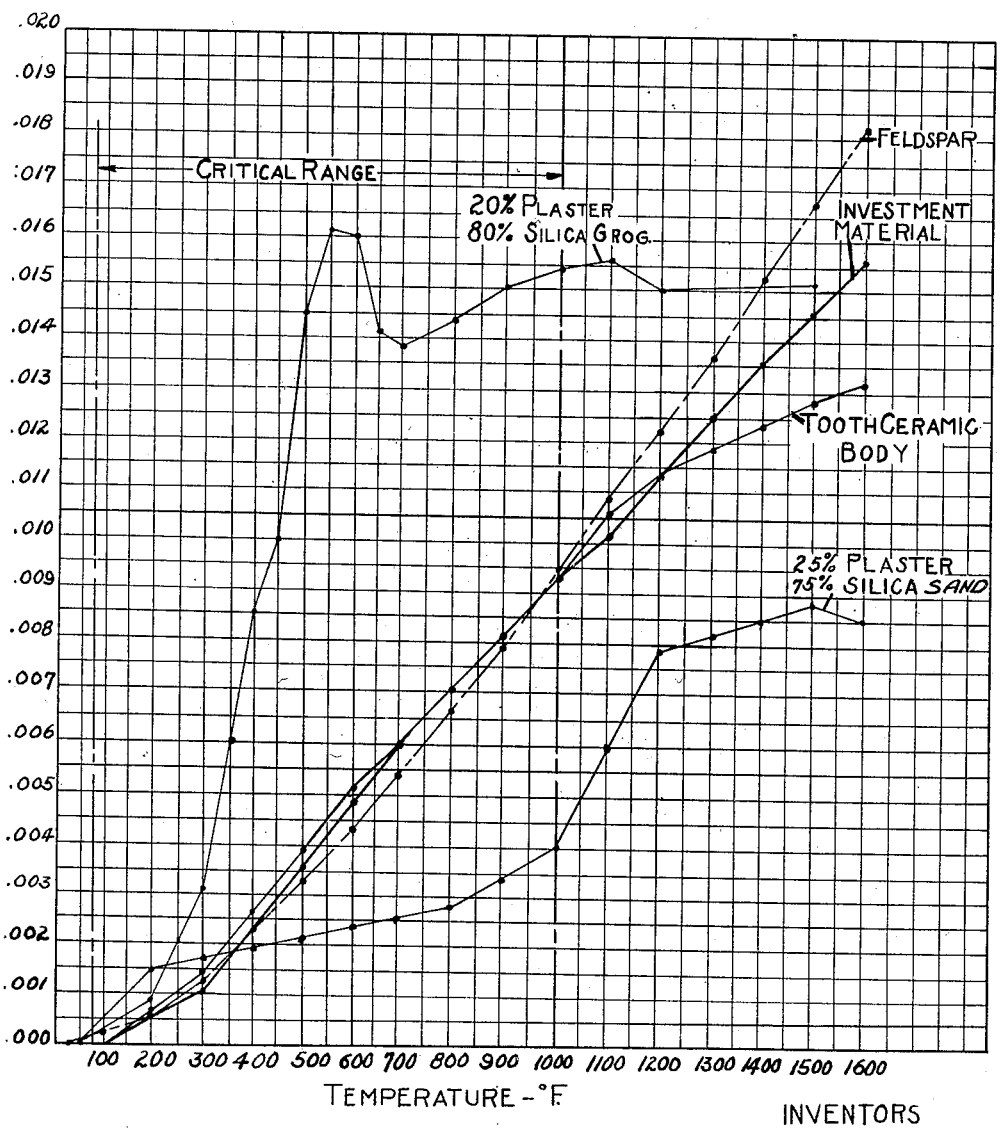

2,293,908

UNITED STATES PATENT OFFICE 2,293,908

ALL CERAMIC DENTURE BASE WITH TEETH, PROCESS, AND MATERIALS FOR PRODUCING SAME

Pyungtoo William Lee and Charles Dietz, York, Pa., assignors to The Dentists' Supply Company of New York, New York, N. Y., a corporation of New York Application May 31, 1939, Serial No. 276,644

2 Claims. (Cl. 32—2)

This invention relates to artificial dentures, characterized in that the teeth and denture base are fused together so as to form an integral unit.

The invention further consists in forming the teeth of ceramic body having a high fusing temperature and afterwards forming and fusing to said teeth the denture base of ceramic body having a relatively low fusing temperature.

The invention further consists in novel ceramic bodies for teeth and base which have a substantially identical thermal expansion and contraction, especially over the critical range between the freezing temperature of the low fusing ceramic body and atmospheric temperature.

In the dental art moulding or attaching of one vitreous body to another of different composition and at a temperature lower than the fusing temperature of the higher fusing body has not been successful up to date, although the theory has been advinced and much claim has been made in dental literature and in patent specifications. Claims were based on the assumption that two different bodies of like coefficient of expansion and contraction could be made or developed, but in practice no one heretofore has been able to produce two such different bodies of different compositions whose coefficients of expansion and contraction are alike, at least from atmospheric temperature to the plastic stage of the lower fusing material, and from that plastic temperature to atmospheric temperature.

In the patent art, while patentees have claimed to accomplish this result with materials having the same coefficient of expansion and contraction, in most cases they have never given the formulae for the materials which would give this result, or if formulae have been given, these formulae have been found to be unsuccessful in practice; and articles, and particularly dentures of this nature, have never heretofore been produced commercially.

Generally the coefficient of expansion and contraction is different in every different ceramic element and material. The coefficient of expansion and contraction of a ceramic material may be changed by various heat treatments as well as by the number of heat treatments which that material receives. Because of these variabilities and possibilities of divergent reactions which will change the cofficient of expansion and contraction, it is extremely difficult to produce two different bodies of different compositions, fusible at two widely different temperatures so that the coefficient of expansion and contraction through the critical range from the plastic state to room temperature of the lower fusing body is identical with that of the higher fusing body, and the fusing of the lower fusing body causes it to combine with and adhere to the higher fusing body, without checking, or the introduction of strains which cause cracks both latent and patent.

It has been found in practice that if the difference in the expansion and contraction of two bodies is greater than .001 inch per linear inch at any point between the room temperature and the plastic stage of the lower fusing body, the two bodies cannot be attached or moulded together without producing checks and cracks in either one or the other of the bodies.

The object, therefore, of the present invention is to produce an integral ceramic unit from two ceramic bodies having widely diverging fusing temperatures.

A further object of the invention is to produce a denture having teeth and base formed in integral unit in which the ceramic body of the teeth has a high fusing temperature and the ceramic body of the base has a relatively low fusing temperature.

A further object of the invention is to provide as an integral unit two vitreous bodies having widely divergent fusing temperatures and characterized by a substantially identical thermal expansion and contraction over the critical range from atmospheric temperature to the plastic stage of the lower fusing material, and back to atmosphere temperature.

A still further object of the invention is to provide a denture having the teeth and base formed in an integral unit and in which the ceramic bodies of said teeth and base have widely divergent fusing temperatures, said bodies being characterized by having a substantially identical thermal expansion and contraction.

Another object of the invention is to provide material for investing the bodies herein above referred to, and which said investment has substantially identical thermal expansion and contraction over the critical range from atmospheric temperature to the plastic stage of the lower fusing material, and back to atmospheric temperature.

Another object of the invention is to provide a method for the fusing into an integral unit two ceramic bodies having widely different fusing temperatures.

To accomplish all the foregoing objects it is necessary to provide ceramic bodies and investment material whose curves of expansion and contraction through certain ranges are harmonious. Nothing found in the prior art will accomplish the results in order to fulfil the foregoing objects.

The ceramic bodies used in artificial teeth vary widely. Each manufacturer has its own formula or formulae and none has been found whose thermal expansion and contraction will produce anything near to a straight line graph. Our research work has been conducted with a determination to find a ceramic body for porcelain teeth which will give nearer to a straight line graph of expansion and contraction.

After providing a ceramic body for the teeth with a suitable expansion and contraction curve, it was then necessary to provide a ceramic body for the denture base with a substantially identical expansion and contraction curve and also to provide an investment material whose expansion and contraction curve was in substantial agreement with those of the tooth and denture base ceramic bodies.

The teeth used in the denture are, therefore, commercial artificial porcelain teeth, fired at or about 2400° F. The expansion and contraction of the ceramic body of the tooth have been accurately determined and measured between atmospheric temperature and the softening temperature thereof.

In the drawings,

Figure 1 which is a graph sheet having as abscissae degrees of temperature in Fahrenheit scale, and as ordinates linear expansion graded in ten-thousandths of an inch, the thermal expansion of the novel tooth ceramic body, the novel denture ceramic body and the novel investment material have been graphically plotted from readings indicated on the most accurate known scientific instrument for this purpose, Figure 2 which is a similar sheet and depicts the thermal expansion curves of two commercial investment materials of general use, ordinary feldspar, the novel investment material, and the novel tooth ceramic material, Figure 3 is a plan view of a denture base model invested in one half of an investment flask and shows a temporary denture base with teeth attached applied to said model.

Figure 4 is a cross-sectional view on the lines 4—4 of Figure 3,

Figure 5 is a like view showing the other half of the flask applied and the temporary denture with teeth invested therein, Figure 6 is a similar view showing the flask inverted and separated and the temporary denture base removed, Figure 7 is a like view showing the novel denture base ceramic body residing in the space formerly occupied by the temporary denture base, and the flask parts re-united, and Figure 8 is a like view showing the relation of parts after fusion of the denture base ceramic body.

In Figure 1, the thermal expansion and contraction curve for the tooth ceramic body is shown by a full light line and marked "tooth ceramic body." The common and principal ingredients from which artificial porcelain teeth are usually produced are feldspar, kaolin and silica. Their proportions may differ. As a ceramic body for the artificial teeth giving the thermal expansion and contraction curve shown in Figure 1, we have devised a formula as follows:

| | Per cent |
|---|---|
| Feldspar | 70 to 90 |
| Amorphous silica | 10 to 30 |

The teeth of this ceramic body may be manufactured either for general commercial use containing the usual dental pins, either of base or precious metal, or may be provided with other means for fastening them to usual and ordinary denture bases. For the purpose of this invention, all such fastening devices may be eliminated, and we shall hereafter refer to teeth without any of these fastening devices as "bare teeth."

In the prior art, numerous ceramic bodies for forming denture bases have been discussed. It has, however, been found that none of the disclosures will give a thermal expansion and contraction curve in any way approximating the curve of the tooth ceramic body shown in Figure 1.

The denture base ceramic body of this invention is compounded in such a way that its thermal expansion and contraction are substantially harmonious with the thermal expansion and contraction of the porcelain of the teeth. This is especially so through the critical range which comprises from atmospheric temperature up to the fusing temperature of the denture base ceramic body, or vice versa. It is especially important that the contraction curve be in agreement from the softening point of the denture base material down through the hardening range to room temperature in order that no cracking may occur, and in order that a perfect union between the two ceramic bodies may be effected.

The softening, maturing or fusing point of the denture base material may be considerably lower than the fusing point of the tooth material. In the present invention, the fusing point of the tooth material may be from approximately 2300° to 2400° F. while the fusing point of the denture base material may be from approximately 1500° to 1600° F. Consequently, the ceramic body of which the teeth are made may be termed a high fusing dental porcelain while the ceramic body of which the denture plate or base is made is between porcelain and glass, probably being closer to glass than to porcelain. The denture base ceramic body which has been developed and which produces a thermal expansion and contraction curve, such as that marked in Figure 1 of the drawings "denture base ceramic body" has the following formula:

| | Per cent |
|---|---|
| Feldspar | 65 to 80 |
| Amorphous silica | 10 to 20 |
| Borax glass | 5 to 15 |

In the ceramic bodies of both the tooth and denture base we have utilized amorphous silica for the following reasons:

1. It produces a low coefficient of expansion and contraction;
2. It lowers the maturing or fusing temperature of the bodies;
3. It eliminates the silica inversions, thereby producing a curve nearer to a straight line;
4. It provides better working processes;
5. It produces stronger bodies.

Under proper control of temperature and time of firing, the tooth and denture base ceramic bodies of the foregoing formulae will expand and contract in substantial harmony. (See Fig. 1.)

In carrying out the process of forming our improved denture the teeth are moulded and fired in the usual way. A model 10 made from the novel investment material and exactly duplicating in size and form the area to be covered by the denture base is cast, and this is invested in the novel investment material 11 in the usual manner in the lower half 12 of a flask. Suitable escapeways 9, as usually provided, may also be provided in carrying out this process. On this model 10 is a temporary denture base 13 composed of material which can be readily melted and which has the artificial teeth 14 set therein. This temporary denture base 13 is identical with the permanent denture base to be produced. (See Figs. 3 and 4.) The lower half of the flask then has a liner or gasket 16 placed on its upstanding peripheral edge, and the upper half 17 of the flask separated from the lower half by this liner. Investment material 18 identical with the material 11 and with the material of the model 10 is then poured in through openings in the top of the upper half 17 of the flask until the same is completely filled. (See Fig. 5.) After the investment material in the upper half 17 has set or hardened so as to secure the artificial teeth therein the flask may be inverted, its parts separated and the temporary denture base melted or washed out. This also washes the material from the escapeways 9. (See Fig. 6.) The liner 16 which formerly separated the halves of the flask is then removed and the novel ceramic body 19 of the denture base filled into the space formerly occupied by the temporary denture base 13. The halves of the flask are then re-united and there will be a space 21 between the edges of the same formerly occupied by the liner 16. (See Fig. 7.)

In addition to the technical difficulty of developing a high fusing tooth ceramic body and a low fusing base ceramic body which are in substantial harmony in expansion and contraction, certain practical advantages are obtained by having the denture base ceramic body fused around 700 to 800° F. lower than the tooth ceramic body. For example, the furnace for fusing the plate ceramic body to the teeth need not be intricate or expensive. The metal flask just above described in which the fusing is accomplished may be made from several inexpensive alloys which will withstand a temperature of 1600° F. or more. There is no danger of the pre-formed tooth being deformed by a heat too close to its softening temperature. The temperature cited will not affect stains or other markings placed on the face of the teeth to achieve certain artistic effects. The type of investment used to form the denture plates need not be excessively high fusing.

Before placing investment material in either section of the flask the side walls of the same have been lined with material 22 which will burn out, compress or otherwise allow for the expansion of the investment material as shown and described in the co-pending application of Pyungtoo William Lee, one of the applicants herein, Serial No. 247,483, filed December 23, 1938.

In order to make the denture plate exactly fit the particular mouth for which it is designed, the denture plate must be formed while plastic over an exact model of that particular mouth. This is the model shown in Figures 3 to 8 of the drawings, and must be made of an investment composition which has a thermal expansion and contraction in practical agreement and harmony with the expansion and contraction of both the tooth ceramic body and denture base or plate ceramic body in order that no checking or fracturing of the teeth or plate shall occur in the cooling process.

Dental investment compositions generally contain a considerable portion of quick setting material, such as gypsum, or plaster of Paris, together with silicious materials such as silica sand and fire clay grog.

In the drawings, Figure 2 shows a thermal expansion and contraction curve of an investment material having 20% plaster of Paris and 80% silica grog. That same figure shows another thermal expansion and contraction curve of an investment material having 25% plaster of Paris and 75% silica sand. The thermal expansion curve of gypsum-silica mixtures as shown is generally characterized by certain sharp breaks due to silica inversions and to dehydration of the sulphate. It has been shown in Figure 1 that the thermal expansion and contraction curves of the new tooth ceramic body and of the new denture base ceramic body have been brought into practical conformity whereas the curves of the commercial investment materials shown in Figure 2 are widely divergent from the curves of the tooth and base ceramic materials, the former of which is also shown in Figure 2. A denture base formed in investments such as those indicated as "commercial" would be badly cracked when cooled.

We have found that feldspar has a very uniform curve of expansion. A thermal expansion and contraction curve of feldspar is shown in Figure 2. We have further found that an investment compound of the following general proportions will give a thermal expansion and contraction curve in substantial harmony with the curves of the tooth and denture base ceramic bodies hereinbefore described. The formula for this new investment material is as follows:

| | Percent |
|---|---|
| A form of calcium sulphate (Hydrocal) | 10 to 25 |
| Feldspar | 30 to 80 |
| Silica grog | 10 to 45 |

The thermal expansion and contraction curve of this investment material is shown in Figures 1 and 2.

In Figure 2, we, therefore, find that through the critical range which we have before discussed, the thermal expansion and contraction curves of the tooth ceramic body, the denture base ceramic body and the investment material are always controlled so as to never vary one from the other more than one-half of one thousandth of an inch.

After the denture base ceramic body 19 has been placed in the recess formerly occupied by the temporary denture base and the flask sections re-united, the flask is then placed in a kiln and the temperature gradually raised to the softening temperature of the denture base ceramic body whereupon pressure is preferably added to the top of the flask to accelerate the coming together of the sections of the flask. (See Fig. 8.) This may be accomplished by merely placing a weight of a few pounds on the upper flask section. It, of course, will be readily seen that the upper part of the flask will by its weight or by gravity come into contact with the lower part of the flask when the denture base ceramic body becomes soft, but the weight will hasten that step and allow for cutting off the heat to the kiln. By adding the weight or pressure to the upper part of the flask, we, therefore, accomplish the following objects:

1. Economize in fuel;
2. Save time;
3. Prevent the temperature from going beyond the necessary temperature to soften the denture base ceramic body.

Dentures made according to the foregoing description and with the given formulae have been produced over a period of time and the process herein described has proven to be substantially one hundred per cent perfect. Care has been taken to make no unjust claims and to be thoroughly convinced of the practicability of the process, the harmonious thermal expansion and contraction of the tooth ceramic body, the denture base ceramic body and the investment material, and the fit and comfort of the resulting dentures, before the filing of an application for patent thereon.

The invention has many advantages. Among these are:

(a) The teeth and denture base comprise an integral unitary structure;

(b) Bare teeth may be used without metal or any other form of anchorages;

(c) Partial plates may be made;

(d) The natural gum pink color of the denture plate is non-fading;

(e) The denture plate is not subject to warpage or to change of form found in Vulcanite plates and in synthetic resin plates;

(f) The denture itself will not permit infiltration of the acids of the mouth. It is, therefore, always clean, free from odors, etc.;

(g) Ceramic material denture bases are kind to the oral tissues and have a pleasantly cool feeling. The mat finish of this denture base ceramic body lends itself to a better adaption and fitting to the oral tissues;

(h) Eliminates the danger of teeth dropping from the denture base as in other types of denture base.

Of course, the denture, the process of making same and the formulae for the tooth ceramic body, the denture base ceramic body, and investment material may be modified in various ways without departing from the invention set forth and described in the appended claims.

The invention is hereby claimed as follows:

1. A dental article comprising a pre-formed vitreous body of high fusing temperature comprising ingredients in the following approximate proportions, feldspar 70 percent to 90 percent and amorphous silica 10 percent to 30 percent, another vitreous body of relatively low fusing temperature fused thereto, and said low fusing temperature body comprising ingredients in the following approximate proportions, feldspar 65 percent to 80 percent, amorphous silica 10 percent to 20 percent, and borax glass 5 percent to 15 percent.

2. A dental article as defined in claim 1 and wherein the coefficients of thermal contraction of both bodies are substantially the same.

PYUNGTOO WILLIAM LEE.
CHARLES DIETZ.

CERTIFICATE OF CORRECTION.

Patent No. 2,293,908.  August 25, 1942.

PYUNGTOO WILLIAM LEE, ET AL.

It is hereby certified that error appears in the printed specification of the above numbered patent requiring correction as follows: Page 1, first column, line 20, for "advinced" read --advanced--; page 3, first column, lines 40 to 45 inclusive, strike out "For example, the furnace for fusing the plate ceramic body to the teeth need not be intricate or expensive. The metal flask just above described in which the fusing is accomplished may be made from several inexpensive alloys which will withstand a temperature of 1600° F. or more." and insert the same after the word and period "fusing." in line 53; page 4, first column, line 23, for "subjact" read --subject--; and that the said Letters Patent should be read with this correction therein that the same may conform to the record of the case in the Patent Office.

Signed and sealed this 27th day of October, A. D. 1942.

Henry Van Arsdale,
Acting Commissioner of Patents.

(Seal)